Sept. 18, 1951     J. S. JARDIM     2,568,637
FRYING PAN COVER

Filed April 27, 1950     2 Sheets-Sheet 1

INVENTOR.
JOAQUIM S. JARDIM
BY
ATTORNEY

Sept. 18, 1951      J. S. JARDIM      2,568,637
FRYING PAN COVER
Filed April 27, 1950      2 Sheets-Sheet 2

INVENTOR.
JOAQUIM S. JARDIM
BY
ATTORNEY

Patented Sept. 18, 1951

2,568,637

UNITED STATES PATENT OFFICE 2,568,637

FRYING PAN COVER

Joaquim S. Jardim, Newark, N. J.

Application April 27, 1950, Serial No. 158,422

4 Claims. (Cl. 183—1)

This invention relates to an improved cover for frying pans.

One object of the invention is the provision of a frying pan cover which will permit steam to escape from the pan and air to enter the pan but which will prevent spattered grease from escaping therefrom.

Another object of the invention is to construct said cover so that the spattered grease prevented from leaving the pan thereby is not returned to the floor of the pan but is trapped in the cover.

Still another object of the invention is to construct the said cover so that the same is readily disassembled for cleaning purposes.

A further object of the invention is to construct the grease trapping means so that the same is readily replaceable.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
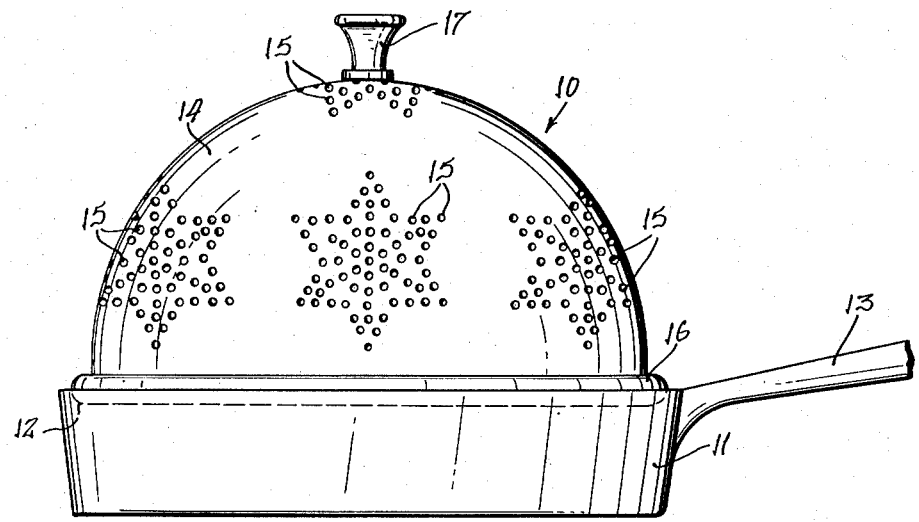
Fig. 1 is a side elevational view of a frying pan, showing the cover thereon.

Referring to Fig. 1 the cover 10 of the invention is shown applied to an ordinary frying pan 11 having a peripheral lip 12 to receive said cover, and having also the usual handle 13.

Figure 2:
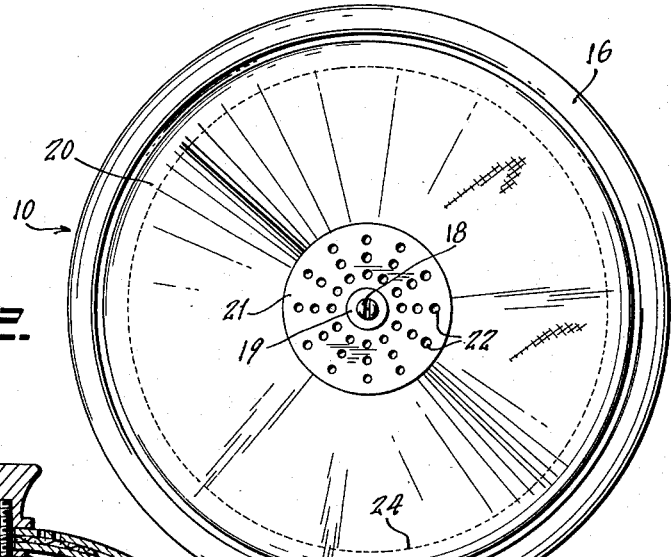
Fig. 2 is a bottom plan view of the frying pan cover.
Figure 3:
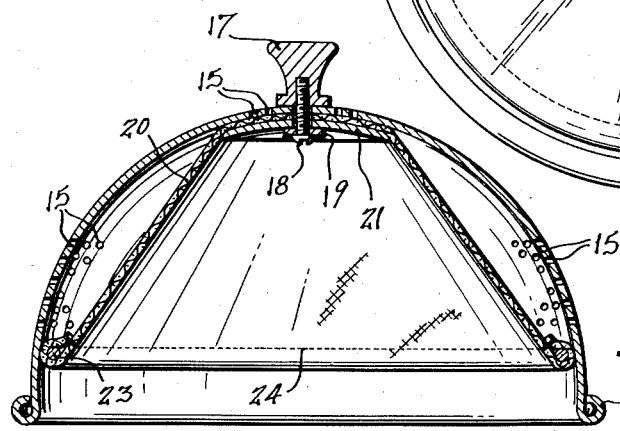
Fig. 3 is a vertical central sectional view of Fig. 2.

The cover 10 comprises, see also Figs. 2 and 3, an outer semi-spherical metal dome 14 having therein a large number of perforations 15 and having also the usual peripheral rolled edge 16. The purpose of the perforations 15 is to permit steam to escape from the covered pan 11 and air to enter the same.

At the apex of dome 14 there is provided a knob-like handle 17 into which is threaded a screw 18 which passes through a hole in the dome and also through holes in a fabric piece 20 and an arcuate metal retainer 21 and through a washer 19 against which the head of the screw bears. Preferably the retainer 21 is provided with perforations 22, and preferably the piece 20 is formed of cheesecloth or like fabric. Piece 20 is circular in form and has its periphery hemmed about a metal ring 23 by stitching 24. Ring 23 is of slightly less diameter than the opening of dome 14 so that the same can be inserted only a short distance within the dome.

The construction is such that the piece 20 is secured at its periphery to the ring 23 and at its center is wedged between the apex of the dome and the retainer 21 so that the same assumes the shape of a frustral cone through which all vapors must pass to escape from the frying pan, and through which air must pass to enter the pan; but the cheesecloth construction of said fabric cone arrests and absorbs drops of grease spattered from the bottom of the pan. Thus such spattered grease is not allowed to mar the objects surrounding the pan, and is not allowed to fall back into the pan on the food being fried, which food, therefore, is in a highly desirable less greasy condition when cooked.

It will be seen that the cover 10 can readily be disassembled for cleaning purposes, and then reassembled, by the proper manipulation of the screw 18.

Figure 4:
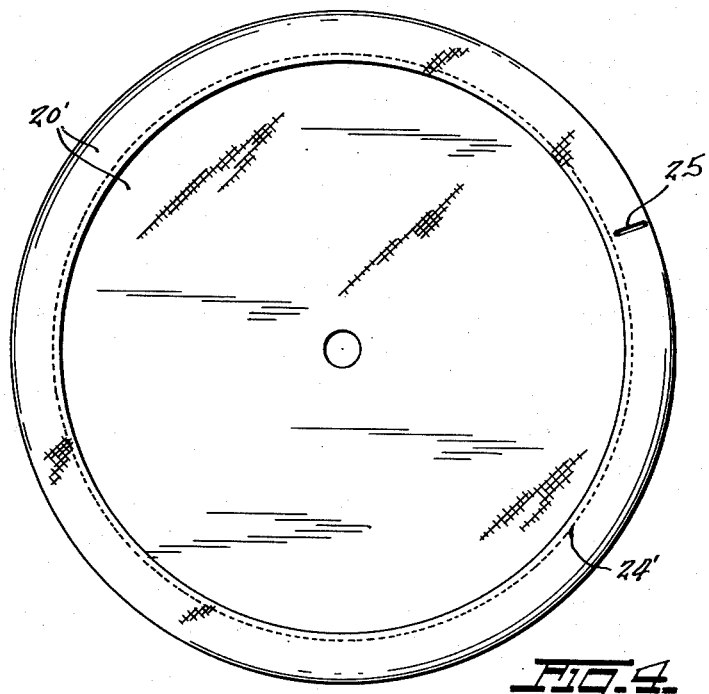
Fig. 4 is a bottom plan view showing a modified form of the fabric piece used in this device.
Figure 5:
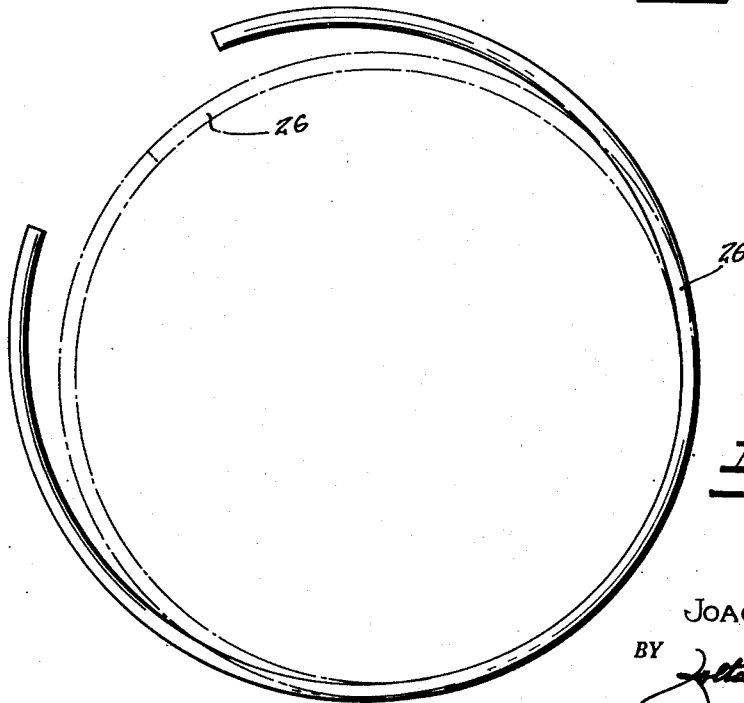
Fig. 5 is a top plan view of the reinforcing ring used in connection with the fabric piece illustrated in Fig. 4.

A modified form of the invention is illustrated in Figs. 4 and 5 wherein like parts are given the same reference numerals as hereinbefore with a prime added. The purpose of this modification is to provide for replacing the fabric filter sheet in a facile manner.

To this end the hem of cheesecloth filter 20' which, it will be remembered, is secured by stitching 24', is provided with an opening 25 by which access to the interior of the hem is obtained. The ring 23 is replaced by a split ring 26 which normally assumes a diameter substantially greater than that of the ring 23, with the ends thereof some distance apart as shown in full lines in Fig. 5, but when compressed so that the ends thereof abut one another as shown in dot and dash lines, the ring 26 has the same diameter as said ring 23.

The construction is such that the ring 26 in expanded condition is inserted through opening 25 into the hem of filter 20'. The said filter is then secured at its center to the apex of dome 14 as described hereinbefore, the ring 26 being compressed to allow its entrance into the said dome. In use this form of the invention differs from that already described only in that the opening 25 permits the insertion and removal of the ring 26 so that the filter 20' can readily be replaced.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A porous grease retainer for the interior of a dome-shaped frying pan cover, comprising a ring within the cover and of a diameter to abut the inner face of the cover closely adjacent its bottom edge, the cover having spaced perforations at a point substantially midway between said ring and the top of the cover, a piece of fabric within the cover and having its peripheral edges secured to said ring, and means releasably securing the center portion of said piece of fabric to the inner face of the cover at the top thereof.

2. A porous grease retainer for the interior of a dome-shaped frying pan cover, comprising a ring within the cover and of a diameter to abut the inner face of the cover closely adjacent its bottom edge, the cover having spaced perforations at a point substantially midway between said ring and the top of the cover, a piece of fabric within the cover and having its peripheral edges secured to said ring, and means releasably securing the center portion of said piece of fabric to the inner face of the cover at the top thereof, said piece of fabric having its peripheral edge hemmed and said ring being continuous and fitted within said hemmed edge.

3. A porous grease retainer for the interior of a dome-shaped frying pan cover, comprising a ring within the cover and of a diameter to abut the inner face of the cover closely adjacent its bottom edge, the cover having spaced perforations at a point substantially midway between said ring and the top of the cover, a piece of fabric within the cover and having its peripheral edges secured to said ring, and means releasably securing the center portion of said piece of fabric to the inner face of the cover at the top thereof, said piece of fabric having its peripheral edge hemmed, said piece of fabric having an opening leading to the interior of its hemmed edge, said ring being a split ring to be slid into and out of said hemmed edge through said opening.

4. A porous grease retainer for the interior of a dome-shaped frying pan cover, comprising a ring within the cover and of a diameter to abut the inner face of the cover closely adjacent its bottom edge, the cover having spaced perforations at a point substantially midway between said ring and the top of the cover, a piece of fabric within the cover and having its peripheral edges secured to said ring, and means releasably securing the center portion of said piece of fabric to the inner face of the cover at the top thereof, said releasable securing means comprising a metal retainer positioned concentrically with said piece of fabric, said metal retainer, said piece of fabric and the top of the cover having aligned holes, a handle positioned on top of the cover and having a threaded recess extended in from its bottom end and aligned with said aligned holes, and a screw extended upward through said aligned holes and threaded into said recess of said handle drawing said metal retainer tight against the inner face of said cover clamping the center portion of said piece of fabric in position between said metal retainer and the inner face of said cover.

JOAQUIM S. JARDIM.

REFERENCES CITED

The following references are of record in the file of this patent:

UNITED STATES PATENTS

| Number | Name | Date |
|---|---|---|
| 1,098,053 | Porter | May 26, 1914 |
| 1,411,223 | Retzback | Mar. 28, 1922 |
| 1,794,940 | Zimmerman | Mar. 3, 1931 |
| 1,942,900 | Peters | Jan. 9, 1934 |
| 2,498,534 | Drum | Feb. 21, 1950 |